United States Patent Office 3,496,000
Patented Feb. 17, 1970

3,496,000
METHOD OF MAKING ARTIFICIAL LEATHER
Graham Rodney Hull, Frank Sharp, and David Leonard Boutle, Dagenham Dock, Essex, England, assignors to Porvair Limited, a company of Great Britain
No Drawing. Filed Mar. 30, 1966, Ser. No. 538,594
Claims priority, application Great Britain, Mar. 7, 1966, 9,977/66
Int. Cl. B44d 1/32
U.S. Cl. 117—11      8 Claims

ABSTRACT OF THE DISCLOSURE

An improved process is disclosed for making a three-layer artificial leather having a porous base zone, a soft tie layer and a wear-resistant surface zone. The tie layer and surface zones are made from solutions of polymers having removable filler particles dispersed therein, the solvent in the tie layer being removed by evaporation while the filler is left in the layer to prevent the solvent used in forming the second layer collapsing the pore structure of the tie layer or the porous base zone.

---

This invention relates to porous material. Particularly, though not exclusively it relates to porous materials suitable for use as replacements for natural leather.

Published microscopic studies have indicated that natural leather can be considered as essentially consisting of two zones; an inner zone, which has been called the main fibre structure; and a surface zone, which has been called the grain layer.

A replacement for leather may also conveniently comprise a zone simulating at least partially the grain layer of natural leather to a greater or lesser degree, which zone for the purposes of this specification will be called the surface zone, and a zone simulating at least partially the main fibre structure of natural leather to a greater or lesser degree, which zone for the purposes of this specification will be called the base zone. The base zone may be a material derived from fibres; such a base zone will be called a fibrous base zone.

Certain problems have arisen in connection with the use of certain types of fibrous base zones. The problems include an unnatural pocked appearance of the surface zone when the material is stretched. This appearance has been likened to that of orange peel and the problem will be referred to as the orange peel effect.

The fibrous base zones in connection with which the orange peel effect is particularly noticeable are those made from mechanically entangled felts and in particular those in which the manufacture of the felt has involved punching with barbed needles. It is believed that the resultant variations in density in the felt cause cavities to form in the base zone when it is stretched, and that these cavities given rise to the orange peel effect.

It is preferable that a felt used to make a fibrous base zone by impregnation with a synthetic plastics material should have a density prior to impregnation in excess of 0.07 gram/cc. The attainment of such densities may require the felt to be needle punched during its manufacture.

According to one aspect of the present invention a material suitable for use as a replacement for leather includes a layer of soft resilient porous polymeric plastics material, which will be referred to as the tie layer, interposed between and attached to a porous base zone sheet, for example a material derived from a fibrous material and including a polymeric plastics base working materials, and a wear resistant surface zone of microporous polymeric plastics material. The tie layer may be a material made from a polymeric plastics material, the tie layer working material, which in the solid continuous phase at 25° C. has a hardness on the Shore A scale in the range 50 to 95, and preferably about 90.

The tie layer working material may be a polyurethane. The polyurethane in the solid continuous phase at 25° C. may have tacky rubbery properties. The polyurethane may be a linear polyurethane having some free hydroxyl groups.

The polyurethane may have the same composition as the proprietary polyurethane material supplied by the B. F. Goodrich Chemical Company under the name Estane 5701Fl.

The tie layer may have a substantially even distribution of pores of substantially spherical shape. The average pore size of the tie layer may be about 20 microns.

In another form of this aspect of the present invention a layer of woven or non woven fibrous material, the sub-surface zone, may be interposed between and attached to the tie layer and the surface zone.

The tie layer may be made by forming a mixture of the tie layer working material, dissolved in a suitable solvent, and a removable solid filler, forming the mixture into a layer on a suitable support, removing the solvent, and removing the filler by leaching with a suitable leaching agent. The ratio of removable solid filler to tie layer working material in the mixture in parts by weight may be in the range 2:1 to 8:1. The removable solid filler may be graded so that the major proportion has a particle size falling in the range 20 to 25 microns.

It will be appreciated that it is preferable that the tie layer working material should be a material which is soluble in solvents which are not significant solvents for the base zone working material, in addition the tie layer working material should be resistant to dissolution by the solvents used for the surface zone.

In another form of the invention the tie layer may be formed by a method disclosed in copending U.S. application Ser. No. 586,471 filed Oct. 13, 1966.

The support on which the tie layer is formed may be the porous base zone sheet.

Alternatively, the support may be a temporary one from which the tie layer is removed after leaching, and the tie layer may be subsequently attached to the porous base zone sheet.

A vapour permeable substantially continuous adhesive layer of porous polymeric plastics adhesive working material may be interposed between and may join together a pair of adjacent sheets and the method may include forming a mixture comprising the adhesive working material, a removable filler, and a solvent for the adhesive working material, which is substantially not a solvent for the removable filler, applying a layer of the mixture to at least one of the sheets, placing the sheets in contact so that a layer of the mixture is formed between the sheets, and removing the solvent and the removable filler from the resulting composite body so as to form the adhesive layer.

Alternatively, the surface zone may be formed directly on the surface of the tie layer or the sub-surface zone.

The fibrous base zone may be made by a method as disclosed in any one of British patent specification Nos. 1,119,573; 1,122,804; and 1,132,594 and U.S. patent application Ser. No. 586,471.

The surface zone may be made by a method as disclosed in any one of British patent specification Nos. 1,122,804; 1,099,676; and 1,132,594 and U.S. patent application Ser. No. 586,471.

It will be appreciated that the method of the present invention can be used to form a material suitable for use as a replacement for leather by being used to join together preformed surface zones and porous base zones or example fibrous base zones.

Thus according to another aspect of the present invention a method of making a porous material comprising two porous sheets, one of which consists of microporous polymeric plastics material, joined together by a vapour permeable substantially continuous adhesive layer of porous polymeric plastics adhesive working material is characterised in that the adhesive layer is prepared by forming a mixture comprising the adhesive working material, a removable filler, and a solvent for the adhesive working material, which is substantially not a solvent for the removable filler, applying a layer of the mixture to at least one of the sheets, and placing the sheets in contact so that a layer of the mixture is formed between the sheets, and removing the solvent and the removable filler from the resulting composite body so as to form the adhesive layer.

One of the sheets may consist of or include a fibrous material. The sheet including a fibrous material may be a material derived from a fibrous material and including a porous plastics base working material. The fibrous material may be a non woven textile material. Alternatively the fibrous material may be a knitted or woven textile material.

According to a further aspect of the present invention a porous material suitable for use as a replacement for leather comprises a fibrous base zone, a layer of woven or non woven fibrous material, the sub-surface zone, attached to the fibrous base zone by an adhesive layer, and a layer, the surface zone, of microporous polymeric plastics surface working material attached to the surface of the sub-surface zone.

The fibres of the fibrous material may be staple fibres, and may be nylon, Terylene, cotton or rayon fibres.

The invention is not dependent on any particular theory as to the way in which the adhesion between the porous sheets is achieved or on any particular theory as to the way in which the vapour permeability of the adhesive layer is achieved.

With regard to the adhesion, it is believed that some or all of the following factors are involved, the relative importance varying according to the nature of the porous sheets being joined together.

(1) Physical interlocking between the adhesive layers and the porous sheets which, it is believed, is assisted by by the use of staple fibres rather than continuous filament fibres. The following adhesive working materials have been found to be particularly suitable for use with staple fibres: plasticised polyvinyl chloride, a polyurethane cross linked in situ.

(2) Chemical bonding between any unreacted isocyanate groups in a polyurethane adhesive working material with reactive hydrogen groups in the materials forming the porous sheets, for example, amide groups in nylon.

As will be appreciated for factor 1 when the porous sheets consist of continuous filament fibres it is desirable to choose the materials from which these are formed and the adhesive working material so that factor 2 may be expected to be involved.

(3) Diaphragms and filaments connecting the porous sheets to the adhesive layer, formed, it is believed when the solvent is removed, as a result of the use of solvents for the adhesive working material which are also at least partially solvents for the materials of the porous sheets, resulting in partial mixture in solution of the two materials.

In one form of the invention the adhesive working material may be a polyurethane.

Thus bearing in mind possible factor 2 above the materials forming the sheets, which will be termed the sheet working materials, may be chosen to comprise chemical compounds having molecules containing groups capable of interacting with groups contained in the molecules of the polyurethane adhesive working material. The groups of the sheet working material may comprise groups containing active hydrogen atoms capable of reacting with isocyanate groups and the groups of the adhesive working material may include isocyanate groups. Thus the or each sheet working material may comprise nylon and the adhesive working material may be a polyurethane having some free isocyanate groups.

The term polyurethane, used in connection with the working materials including those for the tie layer and the adhesive layer, is to be understood in its broadest sense and includes any material derived from the reaction, or a reaction product of a reaction, between an isocyanate, such as a di-isocyanate, and a molecule, which will be called the polyurethane precursor, which should generally be a polymeric molecule, containing at least two groups, such as hydroxyl, amido, or amino groups, which contain hydrogen atoms capable of reaction with an isocyanate group. The polyurethane precursor may be a polyester derivative, or a polyether diol, or a polyester amide.

The polyurethane used as tie layer working material or the adhesive working material may be a thermoplastic elastomer having a low degree of cross-linking, and may be a predominantly linear polymer, and may have an average molecular weight in the range 20,000 to 300,000. The polyurethane may be derived from a polyester.

Polyurethanes of the type disclosed and claimed in German patent specification No. 1,189,268 are particularly suitable.

In a further form of the invention the adhesive layer or the tie layer or both may contain a wetting agent comprising an alkali metal salt of a sulphonated or sulphated derivative of a substituted long chain aliphatic dicarboxylic acid, which will be referred to as a wetting agent of the type specified, which renders the adhesive layer or the tie layer or both hydrophilic or wettable. The wetting agent may comprise a sodium salt of the bis alkyl sulphosuccinates in which the alkyl groups are the isobutyl, methylamyl, octyl, nonyl, or tridecyl groups.

Alternatively the adhesive layer or the tie layer or both may contain a proofing agent comprising a long chain polymer of dialkyl or aryl alkyl siloxane units, which will be referred to as a proofing agent of the type specified, which renders the adhesive layer or the tie layer or both hydrophobic or water repellant. The proofing agent may have the same composition as the proprietary material sold under the name Silicone M.492 or that sold under the name Silicone R.205, by Midland Silicones Limited.

In one form of the method according to the present invention the removal of the solvent from the composite body may involve heating of the body.

Alternatively, the removal of the solvent may involve exposing the body to at least one leaching agent so as to remove the solvent for the adhesive working material, without adversely affecting the porous sheets or the adhesive working material.

The leaching agent may be chosen so that it also removes the removable filler.

It will be appreciated that the lower permeability to liquid water, which may be provided in porous materials made according to the present invention as previously referred to is due to a particular pore size in the porous adhesive layer and its resultant resistance to the ingress of liquid water rather than to any decrease in the permeability of the porous sheets themselves.

Thus if the porous material is to have a low liquid water permeability in the absence of a proofing agent, the pores in the adhesive layer should have a diameter less than 100 microns and preferably less than 10 microns. Accordingly, the removable filler may have a particle size lying substantially in the range 7–25 microns.

The invention is not dependent on any particular theory as to the way in which the pores are formed in the adhesive layer, but in general it is believed that the removal of the solvent while an adhesive layer is constrained between adjacent porous sheets so that it cannot contract freely in all directions, serves to break down the partitions or diaphragms by which the removable filler would otherwise tend to be encapsulated. It is thought that such shrinking while under constraint may be regarded as having somewhat the same effect as allowing the layer to shrink freely in all directions and then stretching it to its original size in one or more directions, thereby breaking down the encapsulation.

Under certain conditions, for example when the adhesive layer is relatively thick, shrinkage may be insufficient to break down encapsulation of the removable filler.

In this case the composite body may be calendered before the removal of the removable filler. The calendering, it is believed, results in the membranes enclosing the filler being ruptured, enabling the filler to be leached out, leaving a labyrinth of interconnected pores of a size of the same order as that of the filler particles.

In another form of the invention the adhesive working material may be made in situ by reaction in the mixture.

Thus the working material may be made from a polyurethane prepolymer, which is chain-extended in situ. The polyurethane prepolymer may be a liquid polyurethane elastomer, for example the proprietary material supplied by Du Pont (U.K.) Limited under the name Adiprene dissolved in a suitable solvent, and may be chain-extended by reaction with a material comprising a diamine, which may be aliphatic, for example diamino hexane, or aromatic, for example 4,4'-methylene-bis-(2-chloroaniline). An example of a material comprising 4,4'-methylene-bis-(2-chloroaniline) is the proprietary material supplied by Du Pont (U.K.) Limited under the name Moca. An example of a material comprising an aromatic diamine is the proprietary material supplied as Shell curing agent Epicure Z, which can be mixed with diamino hexane to produce a modified chain extending agent including diamino hexane and Shell curing agent Epicure Z.

If heat is used to remove the solvent it may be sufficient to cure the polyurethane.

The polyurethane may be allowed to cure for a further length of time, for example at an elevated temperature, for example 90° C., for example in the case of Moca for 5 days, but in the case of Epicure Z or diamino hexane, for 24 hours, prior to the removal of the removable filler.

Alternatively the adhesive working material may be a polyurethane capable of being cross-linked by an isocyanate cross-linking agent, and the adhesive mixture may contain such an adhesive working material and an isocyanate cross-linking agent and cross-linking may be allowed or caused to occur in situ in the adhesive layer. The adhesive working material may be a polyurethane containing unreacted active hydrogen groups.

An example of such a polyurethane is the proprietary polyurethane material sold under the name Daltoflex 2S. An example of a suitable cross-linking agent for use with Daltoflex 2S is the proprietary material sold under the name Suprasec G.

Conveniently, the adhesive mixture may comprise a mixture of solutions of Daltoflex 2S in cyclohexanone (for example a 50% by weight solution) and Suprasec G in ethyl acetate (for example a 75% by weight solution).

Bearing in mind possible factor 3 the solvent for the adhesive working material may be a partial solvent for the or each sheet working material.

If the composite body is to contain a surface active agent, the surface active agent may conveniently be present in the adhesive mixture or the tie layer working material mixture or both, for example by being mixed with or dissolved in the solvent.

The invention may be put into practice in various ways but two examples will be described to illustrate the invention.

In the examples all parts are given in parts by weight. The water vapour permeability values (WVP) are expressed in grams/square metre/24 hours and are determined by the method described in British standard specification 3,177/1959 but carried out at 38° C. with a nominal humidity gradient of 100% relative humidity. The hydrostatic head values are expressed in mm. Hg and are determined by conventional methods.

EXAMPLE 1

In this example a replacement leather material suitable for use as a shoe upper material and incorporating a tie layer in accordance with the present invention will be described.

The replacement leather material incorporates a fibrous base zone, to one face of which is attached the tie layer. A surface zone of microporous polymeric plastics material is attached to the surface of the tie layer and a lacquer may be deposited on the surface of the surface zone.

The fibrous base zone

The fibrous base zone is a felt impregnated with a thermoplastic polyurethane the ratio of felt to working material being about 1:1.25.

The felt is made from nonretractable staple nylon fibres by a mechanical entangling process involving needle punching.

The fibrous base zone has a smooth surface prepared by slitting a multiple thickness impregnated felt with a band knife.

The felt before impregnation has the following properties:

Thickness—4.3 mms.
Weight in grams/metre$^2$—653
Weight in grams/metre$^2$/mm. thickness—141
Density—0.9 grm./cc.

The following properties are all measured on a Houndsfield Tensometer.

Tensile strength, extension percent, and initial modulus are measured in a continuous test on a single sample.

The material to be tested has an L direction, the direction of travel of the material during its formation, and an X direction, the direction at right angles to the L direction. For each material separate tests are made in the L and X directions.

These are done on two samples 6" long and ½" wide cut from the material to be tested with the lengths of the samples parallel to the L and X directions of the material respectively.

The samples are mounted in the tensometer with their ends gripped in the jaws of the machine. The samples are then loaded to produce a constant rate of extension of 4 inches per minute.

The term Initial modulus (felt) used herein, is defined as the load in lbs./inch width of the sample/mm. thickness required to produce a 10% extension in length under these loading conditions.

The term Tensile strength as used herein, is defined as the load in lbs./inch width/mm. thickness at which the sample ruptures under these loading conditions.

The term Extension percent as used herein, is defined as the percent increase in length of the sample at the time of rupture.

Tear strength is measured on a specially shaped sample. As for the other three properties the samples are 6" long and ½" wide and are cut with their lengths in the L and X directions respectively. In addition a small notch is cut at the mid point of one side and a small corresponding bulge is formed opposite the notch and extending outwards from the other side. The samples are in fact punched out of the material to be tested.

The notch propagates a tear in the test and the term Tear strength used herein is defined as the load in lbs./mm. thickness required to rupture this sample.

Initial modulus (felt)—L1.13 X0.56
Tensile strength—L24.6 X55.0
Extension percent—L125 X100
Tear strength—L8.9 X14.6

The fibrous base zone is made by impregnating this felt with a 20% solution of an elastomeric polyurethane formulation in DMF. This formulation will be described below and will be referred to as formulation P.P. 90. The impregnated felt is then immersed in water and washed with water until all the DMF is removed. The felt is then dried at 100° C. and slit to 1 mm. thickness on a band knife slitting machine.

The surface zone

The following mixture (SZ) is used in the formation of the surface zone.

Surface working material—a thermoplastic polyester based polyurethane formulation, which will be described below and will be referred to as formulation P.P. 98 _____ 25
Solvent—DMF _____ 75
Removable filler—sodium chloride ground to a particle size range of 20–25 microns _____ 75
Pigment _____ 1.25

The mixture (SZ) is formed by triple roll milling followed by degassing under vacuum.

The lacquer

The following mixture (L) is used in the formation of the lacquer.

Lacquer working material—a thermoplastic polyurethane, the proprietary material sold by I.C.I Limited under the names Daltosec 258 _____ 4
And Daltosec 158 _____ 1
Solvent—DMF _____ 95

The tie layer

Mixture 1.—The tie layer working material mixture used to form the tie layer has the following composition:

Tie layer work material—a thermoplastic polyester based polyurethane, the proprietary material sold by B. F. Goodrich Chemical company under the name Estane 5701FI _____ 25
Solvent—dimethylcyclohexanone (Sextone) _____ 75
Removable filler—sodium chloride ground to a particle size range of 20–25 microns _____ 75

The tie layer working material has a hardness on the Shore A scale in the solid continuous state at 25° C. of 90.

The mixture is formed by triple roll milling, followed by degassing under vacuum.

The smooth surface of the 1 mm. thick fibrous base zone is doctor knife coated with mixture 1 using a gap setting between 0.005 and 0.040 inch, in this example 0.015 inch, and dried at 100° C. for 15 minutes, to produce a tie layer 0.007 inch thick.

The surface of the tie layer is then doctor knife coated with a layer of mixture (SZ) using a gap setting of 0.040 inch.

The composite sheet is immersed in water at 20° C. for 20 minutes and then washed with water at 80° C. for two hours and then dried at 100° C. for one hour. The resultant thickness of the tie layer and the surface zone together is 0.025 inch.

The surface of the surface zone is then sprayed with mixture (L) using a spray gun at a rate of between 5 and 100 grams per square metre, in this example 10 grams of mixture (L) per square metre, and dried at 100° C.

The material before spraying with mixture (L) has a WVP of 3500, a hydrostatic head of 120 and a good flex life. The material after spraying with mixture (L) has a WVP of 2600, a hydrostatic head of 150 and a good flex life. Both materials have a satisfactory smooth surface both when unstretched and stretched to the degree liable to be encountered under normal use as a shoe upper material.

EXAMPLE 2

This is an example of the production of a synthetic leather comprising a surface zone of a microporous elastomeric polyurethane, a sub-surface zone of woven or non woven cotton, and a porous fibrous base zone of a polyurethane impregnated mechanically entangled nylon felt.

The inclusion of a woven sub-surface zone may be of advantage in connection with synthetic leathers of the type disclosed in British patent specifications 1,122,804 and 1,099,676. It has been found that the incorporation of a woven or non woven sub-surface zone in such a synthetic leather tends to reduce the tendency of the surface zone to shrink or pock on stretching due to any irregularities or unevennesses in the base zone by providing a more uniform surface on which to deposit the surface layer.

The sub-surface zone is a woven cotton sheet produced from staple fibres.

The adhesive mixture has the following composition:

Adhesive working material—the thermoplastic polyurethane formulation P.P. 98 _____ 25
Solvent—dimethyl formamide _____ 75
Removable filler—sodium chloride (ground to a particle size in the range 7–25 microns) _____ 75
Pigment _____ 2.5

The adhesive mixture is coated first onto the fibrous base zone made as described in Example 1. The cotton sheet is then placed on the coated surface of the fibrous base zone and a surface zone layer of mixture (SZ) deposited as described in Example 1 on the sub-surface zone to produce a composite body. The composite body is then heated at 90° C. for 20 minutes to remove the solvent. The sheet is leached with water at 60° C. for 1 hour and then dried.

Additives can be added to the adhesive mixture, or the tie layer working material mixture. If desired a wetting agent may be added to the mixture, joining the sub-surface zone to the fibrous base zone, or to the tie layer mixture, and a proofing agent to the adhesive mixture of any adhesive layer which may be used to join the surface zone to the sub-surface zone or to the tie layer.

Both the polyurethane formulations P.P. 90 and P.P. 98 are made by the method disclosed in German patent specification No. 1,189,268.

Thus a linear polyester containing hydroxyl groups is produced by reacting adipic acid with ethylene glycol. This polyester has a molecular weight of approximately 2000, a hydroxyl index around 50 and an acid number of 1. This polyester (1000 grams) is heated to approximately 120° C. with 1,4-butylene glycol (90 grams), molybdenum disulphide (10 grams) and silicone oil (20 grams).

Both the polyester and the glycol are adequately dehydrated before being reacted together.

Solid 4,4'-diphenylmethane-di-isocyanate (400 grams) is added to the heated mixture with vigorous stirring, which is continued until the solid has dissolved, the temperature reaching about 100° C. After about 2 minutes the liquid is poured onto plates preheated to approximately 110° to 130° C. After approximately 10 minutes the mass is stripped from the plates, allowed to cool to room temperature, and granulated in a conventional granulating machine.

As taught in the German specification mentioned above the polyurethanes made by this method can be made to have a wide range of hardness. Physical test data are given in the table below for the two formulations P.P. 90 and P.P. 98.

| Test | BSS. 903 | Dimension | Formulation P.P. 90 | P.P. 98 |
|---|---|---|---|---|
| Hardness | | Shore A | 91/92 | 96/97 |
| Tensile strength | A2 type D | Kgs./cm.² | 321 | 278 |
| Modulus at 100% extn. | A2 type D | Kgs./cm.² | 110 | 186 |
| Modulus at 300% extn. | A2 type D | Kgs./cm.² | 151 | 225 |
| Elongation at break. | A2 type D | Percent | 630 | 470 |
| Tensile strength | A3 | Kgs | 31 | 44 |
| Abrasion resistance. | A9 method, A standard, Rubber A. | An index | 520 | 695 |
| Compression set | A6 method, B type 1. | Percent | 7.85 | 6.0 |

What we claim as our invention and desire to secure by Letters Patent is:

1. A method of making an artificial leather comprising a tie layer of soft resilient porous polymer interposed between and attached to a porous base zone sheet and a wear resistant surface zone of microporous polymer, said method comprising:
   (a) depositing on said base zone a layer of a first mixture comprising the tie layer polymer dissolved in an organic solvent, said first mixture having dispersed through it solid particles of a removable filler, and removing said solvent by evaporation,
   (b) forming on said layer of said tie layer polymer a layer of a second mixture comprising the surface zone polymer in an organic solvent, said second mixture having dispersed through it solid particles of a removable filler,
   (c) treating the composite body with a leaching agent to remove the solvent and coagulate the surface zone polymer, and to leach out the filler from said layer of tie layer polymer and said layer of surface zone polymer, and
   (d) drying said composite material.

2. A method as claimed in claim 1 in which said tie layer polymer is one which in the solid continuous phase at 25° C. has a hardness on the Shore A scale in the range 50 to 90.

3. A method as claimed in claim 1 in which said first mixture is deposited on the base zone as a layer between 5 and 40 thousandths of an inch thick.

4. A method as claimed in claim 1 in which said removable filler has been graded so that it has an average particle size falling substantially in the range 7 to 25 microns.

5. A method as claimed in claim 1 in which the ratio of removable filler to tie layer polymer in said first mixture is in the range 2:1 to 8:1 in parts by weight.

6. A method of making an artificial leather which comprises:
   (a) making a porous base zone by impregnating a sheet of non-woven fibrous material, made from non-retractable staple fibers, selected from the group consisting of polyamide, polyester, cotton and regenerated cellulose fibers, by a mechanical entangling process involving needle punching, with a solution of an elastomer in an organic solvent, washing out the solvent with a non-solvent for the elastomer to produce a porous fibrous felt with elastomer distributed therethrough and drying the impregnated fibrous material,
   (b) depositing on the porous base zone as a layer between 5 and 40 thousandths of an inch thick, a layer of a first mixture comprising a soft elastomeric tie layer polyurethane dissolved in an organic solvent, said mixture having dispersed through it solid particles of a removable filler, the ratio of said filler to said soft elastomeric polyurethane being between 2:1 and 8:1 in parts by weight, and removing the solvent by evaporation,
   (c) forming on said layer of said tie layer polymer a layer of a second mixture comprising elastomeric surface zone polyurethane in an organic solvent, said second mixture having dispersed through it solid particles of a removable filler, the ratio of said filler to said elastomeric surface zone polyurethane being between 2:1 and 8:1 in parts by weight,
   (d) treating the composite body with water to remove the solvent and coagulate the surface zone polyurethane into a microporous sheet, and leaching out the filler from said layer of tie layer polymer and said layer of surface zone polymer, and
   (e) drying said composite material.

7. A method as claimed in claim 6 in which said tie layer polymer is one which in the solid continuous phase at 25° C. has a hardness on the Shore A scale in the range 50 to 90.

8. A method as claimed in claim 6 in which said removable filler has been graded so that it has an average particle size falling substantially in the range 7 to 25 microns.

References Cited

UNITED STATES PATENTS

| | | | |
|---|---|---|---|
| 3,284,274 | 11/1966 | Hulslander et al. | 161—159 |
| 3,336,158 | 8/1967 | Wada et al. | 117—135.5 |
| 3,387,989 | 6/1968 | West et al. | 161—164 |

WILLIAM J. VAN BALEN, Primary Examiner

U.S. Cl. X.R.

117—76, 135.5; 161—159